United States Patent
Takahashi

(10) Patent No.: US 7,426,319 B2
(45) Date of Patent: Sep. 16, 2008

(54) IMAGE PROCESSING APPARATUS, IMAGE PROCESSING METHOD, IMAGE PROCESSING SYSTEM, PROGRAM, AND STORAGE MEDIUM

(75) Inventor: Kazuhiko Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 686 days.

(21) Appl. No.: 11/016,912

(22) Filed: Dec. 21, 2004

(65) Prior Publication Data

US 2005/0152618 A1 Jul. 14, 2005

(30) Foreign Application Priority Data

Dec. 26, 2003 (JP) ............................. 2003-435271

(51) Int. Cl.
*G06K 9/32* (2006.01)
(52) U.S. Cl. .................. 382/294; 382/128; 128/922; 378/4; 345/629
(58) Field of Classification Search .............. 382/100, 382/128–133, 294, 295; 345/418, 619, 629, 345/634, 641; 128/922; 378/4–27
See application file for complete search history.

(56) References Cited

U.S. PATENT DOCUMENTS

| 5,359,513 | A | 10/1994 | Kano et al. ............ 364/413.23 |
| 6,181,832 | B1 * | 1/2001 | Maas, III .................... 382/294 |
| 6,434,279 | B1 * | 8/2002 | Shiba .......................... 382/294 |
| 6,677,956 | B2 * | 1/2004 | Raskar et al. ................ 345/581 |
| 7,191,109 | B2 * | 3/2007 | Ohba et al. ..................... 703/6 |
| 7,254,257 | B2 * | 8/2007 | Kim et al. .................... 382/118 |
| 7,292,714 | B2 * | 11/2007 | Seissler et al. .............. 382/128 |
| 2003/0165260 | A1 | 9/2003 | Kim et al. .................... 382/118 |
| 2003/0169908 | A1 * | 9/2003 | Kim et al. .................... 382/118 |
| 2005/0043614 | A1 * | 2/2005 | Huizenga et al. ............ 600/427 |
| 2005/0215884 | A1 * | 9/2005 | Greicius et al. ............. 600/410 |

FOREIGN PATENT DOCUMENTS

JP 7-037074 A 2/1995

OTHER PUBLICATIONS

"Independent Component Analysis", New Method of Multivariate Data Analysis, Shunichi Amari and Noboru Murata, SGC Library—18, Saiensu-Sha Co., Ltd., 2002 (with partial translation).
Chen Haufu, et al., "A new method for fMRI data processing: Neighborhood independent component correlation algorithm and its preliminary application", vol. 32, No. 5, pp. 685-692, Oct. 2, 2002 (with English translation).
Yang Zhu-ging, et al., "Application of Independent Component Analysis in Image Processing", vol. 24, No. 5, 2002, pp. 65-67 (with English translation).

* cited by examiner

*Primary Examiner*—Anand Bhatnagar
(74) *Attorney, Agent, or Firm*—Fitzpatrick, Cella, Harper & Scinto

(57) ABSTRACT

In an image processing method, two images are inputted and the two inputted images are aligned. Then, an independent component analysis process using the two aligned images are performed.

10 Claims, 16 Drawing Sheets

IMAGE PROCESSING APPARATUS, IMAGE PROCESSING METHOD, IMAGE PROCESSING SYSTEM, PROGRAM, AND STORAGE MEDIUM

FIELD OF THE INVENTION

The present invention relates to an image processing apparatus, image processing method, image processing system, program, and storage medium which align a plurality of images radiographed by a medical diagnosis device such as a CR or MRI at different times to perform a difference process.

BACKGROUND OF THE INVENTION

Utilization of digital images has recently been increasing in the field of medical diagnostic imaging. For example, an apparatus which radiographs an X-ray image using a semiconductor sensor has an advantage in practical terms over a conventional radiographic system using a silver halide film. More specifically, the apparatus records an image over an extremely wide radiation exposure area, and it is easy to build a system efficient in image storage and transmission using the apparatus.

Digitization of medical images allows a diagnosis form which is hard to implement using a conventional silver halide film. More specifically, to compare X-ray images radiographed at different time points during, e.g., a follow-up for a patient, a conventional process of placing a film on a viewing screen and comparative radiogram interpretation is generally performed. In this interpretation, it is important to find a difference. To find a difference between two films, rich experience and power of observation, i.e., the ability to carefully observe details are necessary.

With digital images, a change between images can be grasped more accurately. More specifically, two digital images radiographed at different time points are aligned such that their normal anatomical structures coincide with each other, and a difference process is performed to generate and output a difference image. The difference image is interpreted while being compared with the pair of original images. The generated difference image indicates only a difference. Accordingly, comparative radiogram interpretation can be performed more easily than interpretation using films. This is a technique which supports radiogram interpretation called difference-over-time CAD (Computed Aided Diagnosis).

U.S. Pat. No. 5,359,513 discloses such processing method of generating a difference image. With this method, two chest X-ray images radiographed at different time points can be aligned to generate a difference image.

FIG. 16 is a diagram of the arrangement of such difference image generation display apparatus. The first and second images are medical image data of a specific part radiographed at different time points. Since the images are radiographed at the different time points, the radiographic conditions of the two images do not completely coincide with each other. For example, in the case of X-ray images, radiographic condition parameters such as X-ray dose, tube voltage, tube current, and the like do not coincide with each other. The images are different from each other in image density and different in position and posture of an object to be radiographed.

Two image data obtained by radiographing an object are corrected in a density correction unit 1 such that their image signal density value distributions are substantially equal to each other. The corrected image data are corrected in an alignment unit 2 using the positional relationship between their anatomical structures. Corresponding pixels of the image data undergo a difference process in a difference operation unit 3 to generate a difference image. The difference image is displayed on a display unit 4 together with the first and second images.

However, difference-over-time CAD is not completely satisfactory in a medical image processing method of detecting a change over time. The precision of the difference process depends on the precision of a correction process which uniformly corrects the image signal density value distributions in the density correction unit 1.

For example, two images obtained by radiographing an object from a single position are considered. Assume that the first image is radiographed at time t1 and second image is radiographed at time 2. Also, assume that the postures of the object are the same for the sake of descriptive simplicity. Although the first image and second image have many commonalities or similarities, they are always different in details and density. For example, if an object is the chest of a patient, and X-ray imaging is used as a radiographic method, the first and second images are different in diaphragm position or the like and also different in X-ray dose. Accordingly, resultant images are different in density. Even in the case of non-X-ray images, the first and second images cannot be obtained in completely the same manner when an object is a human.

Letting x1 (x,y) be the density of the first image, x2 (x,y) be the density of the second image, and $\Delta(x,y)$, be the density of a change-over-time portion, these densities have the following relationship:

$$x1(x,y) = s(x,y)$$

$$x2(x,y) = a \cdot s(x,y) + \Delta(x,y)$$

where s(x,y) represents the density of a structure common to the first and second images, and $\underline{a}$ is a constant. Since the radiographic conditions for the first and second images are different, the constant $\underline{a}$ is not limited to 1. The density correction unit 1 estimates the constant $\underline{a}$ such that the density of the second image is equal to that of the first image. If the estimation result is a', a difference process result h(x,y) is represented by:

$$\begin{aligned} h(x, y) &= x2(x, y) - a' \cdot x1(x, y) \\ &= a \cdot s(x, y) + \Delta(x, y) - a' \cdot s(x, y) \\ &= (a - a') \cdot s(x, y) + \Delta(x, y) \end{aligned}$$

If the constant $\underline{a}$ is correctly estimated, since a'=a, the following equation holds:

$$h(x,y) = \Delta(x,y)$$

On the other hand, the estimation result is not correct, the following inequality holds:

$$|(a - a') \cdot s(x,y)| > |\Delta(x,y)|$$

The change over time $\Delta(x,y)$ cannot be detected and is buried in (a−a')·s(x,y) on the left-hand side. If the detailed structures are not different, the change over time $\Delta(x,y)$ becomes 0, and 0 should be output as the difference process result h(x,y). If the estimation result of the constant a is not correct, the following equation holds:

$$h(x,y) = (a-a') \cdot s(x,y)$$

In other words, even if no change such as lesion occurs in an object, the doctor may determine that there is a change over time. This determination induces erroneous diagnosis of the doctor.

SUMMARY OF THE INVENTION

The present invention has been made to solve the above-mentioned problems, and has as its object to provide an image processing apparatus, image processing method, image processing system, program, and storage medium which can detect a change over time between two images which are different in time series at high precision.

In order to attain the above-mentioned object, according to an aspect of the present invention, there is provided an image processing method comprising an image input step of inputting two images, an alignment step of aligning the two images, and an independent component analysis processing step of performing an independent component analysis process using the images aligned in the alignment step.

In order to attain the above-mentioned object, an image processing apparatus according to another aspect of the present invention has the following arrangement.

That is, the image processing apparatus comprises an image input unit configured to input two images, an alignment unit configured to align the two images, and an independent component analysis processing unit configured to perform an independent component analysis process using the images aligned by the alignment means.

In order to attain the above-mentioned object, according to still another aspect of the present invention, there is provided a program for causing a computer to execute an image processing method of performing an independent component analysis process using two images, the program causing the computer to execute an image input step of inputting two images, an alignment step of aligning the two images, and an independent component analysis processing step of performing an independent component analysis process using the images aligned in the alignment step.

In order to attain the above-mentioned object, according to still another aspect of the present invention, there is provided a computer-readable storage medium which has a program recorded thereon for causing a computer to execute an image processing method of performing an independent component analysis process using two images, the program causing the computer to execute an image input step of inputting two images, an alignment step of aligning the two images, and an independent component analysis processing step of performing an independent component analysis process using the images aligned in the alignment step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
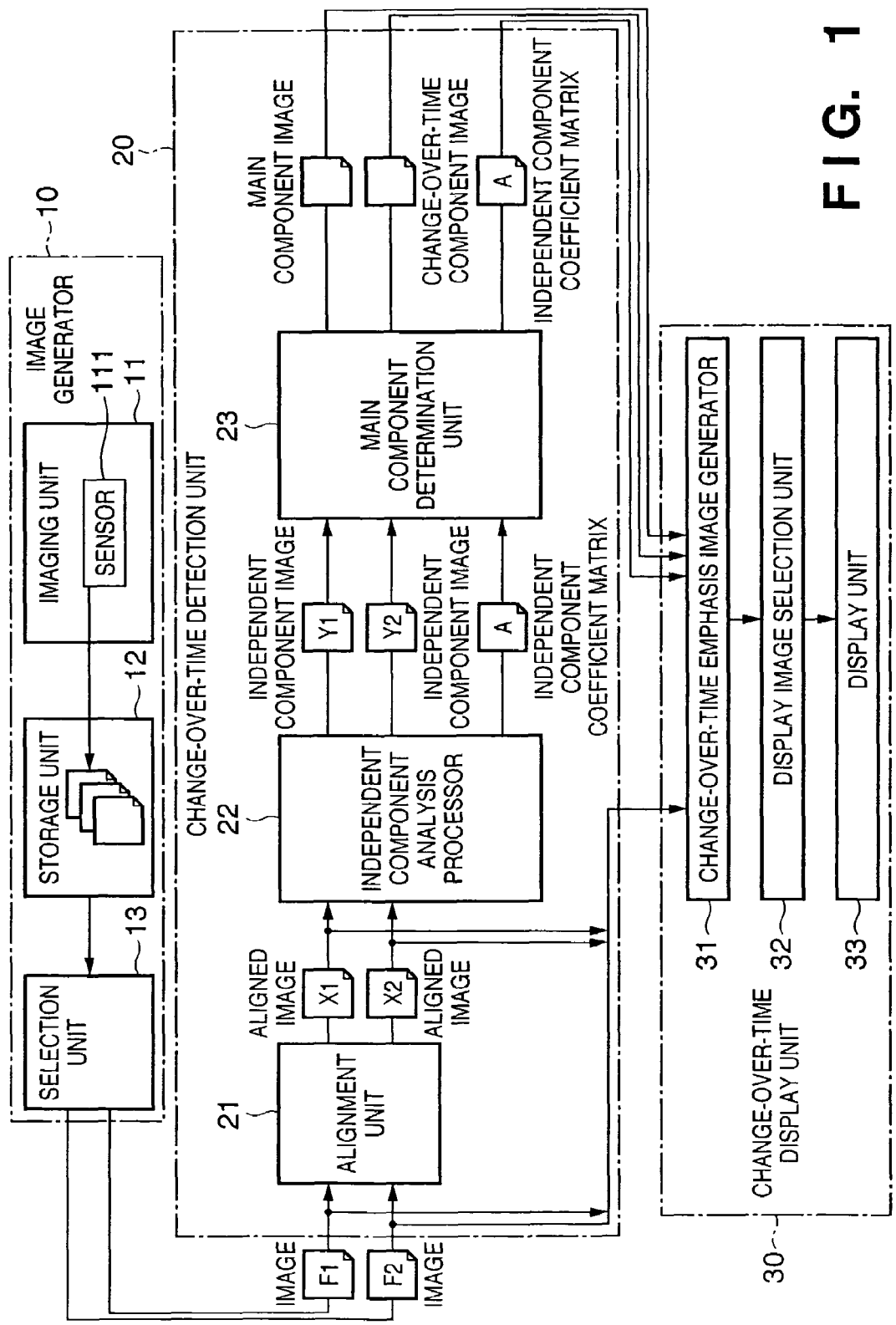
FIG. 1 is a block diagram of the arrangement of an image processing system.

FIG. 1 is a diagram of the arrangement of an image processing apparatus according to the present invention. Two images F1 and F2 output from an image generator 10 pass through a change-over-time detection unit 20 and are sent to a change-over-time display unit 30. In the image generator 10, the image output of an imaging unit 11 having a sensor 111 passes through a storage unit 12 and selection unit 13 and are connected to the change-over-time detection unit 20.

The change-over-time detection unit 20 comprises an alignment unit 21 which receives the two images F1 and F2 from the image generator 10. The two images F1 and F2 are also sent directly to the change-over-time display unit 30. Aligned images X1 and X2 generated in the alignment unit 21 are sent to an independent component analysis processor 22 and also to the change-over-time display unit 30. Independent component images Y1 and Y2 and independent component coefficient matrix A obtained in the independent component analysis processor 22 are sent to a main component determination unit 23. A main component image and change-over-time component image generated in the main component determination unit 23 and the independent component coefficient matrix A are sent to the change-over-time display unit 30.

In the change-over-time display unit 30, the output of the change-over-time detection unit 20 passes through a change-over-time emphasis image generator 31 and display image selection unit 32 and is connected to a display unit 33.

In the image generator 10, a radiographed image of an object obtained by the sensor 111 and generated by the imaging unit 11 is stored in the storage unit 12. The selection unit 13 selects two images to output the digital radiographed images F1 and F2.

Any radiographic apparatus can be used as the sensor 111 as long as it outputs a digital image signal. An X-ray imaging apparatus such as an FPD (Flat Panel Detector) or CR (Computed Radiography) apparatus, MRI (Magnetic Resonance Imaging) apparatus, U.S. (Ultrasonic) Echo apparatus, or the like is adopted as the sensor 111.

The storage unit 12 and selection unit 13 can be implemented by, e.g., an external storage device such as a hard disk accompanying a computer which controls the above-mentioned radiographic apparatus and an input designating device such as a mouse or keyboard. In other words, the user may interactively designate an image stored in a hard disk using these input designating devices or two images may automatically be selected in accordance with a predetermined rule.

The change-over-time detection unit 20 receives the radiographed images F1 and F2 output from the image generator 10 and outputs a main component image and change-over-time component image (to be described later). In the change-over-time detection unit 20, the alignment unit 21 aligns the two input radiographed images to correct a positional shift between them. The subsequent independent component analysis processor 22 performs analysis to output components constituting an image, and the main component determination unit 23 generates and outputs a change-over-time detection image and change-over-time emphasis image.

Figure 2:
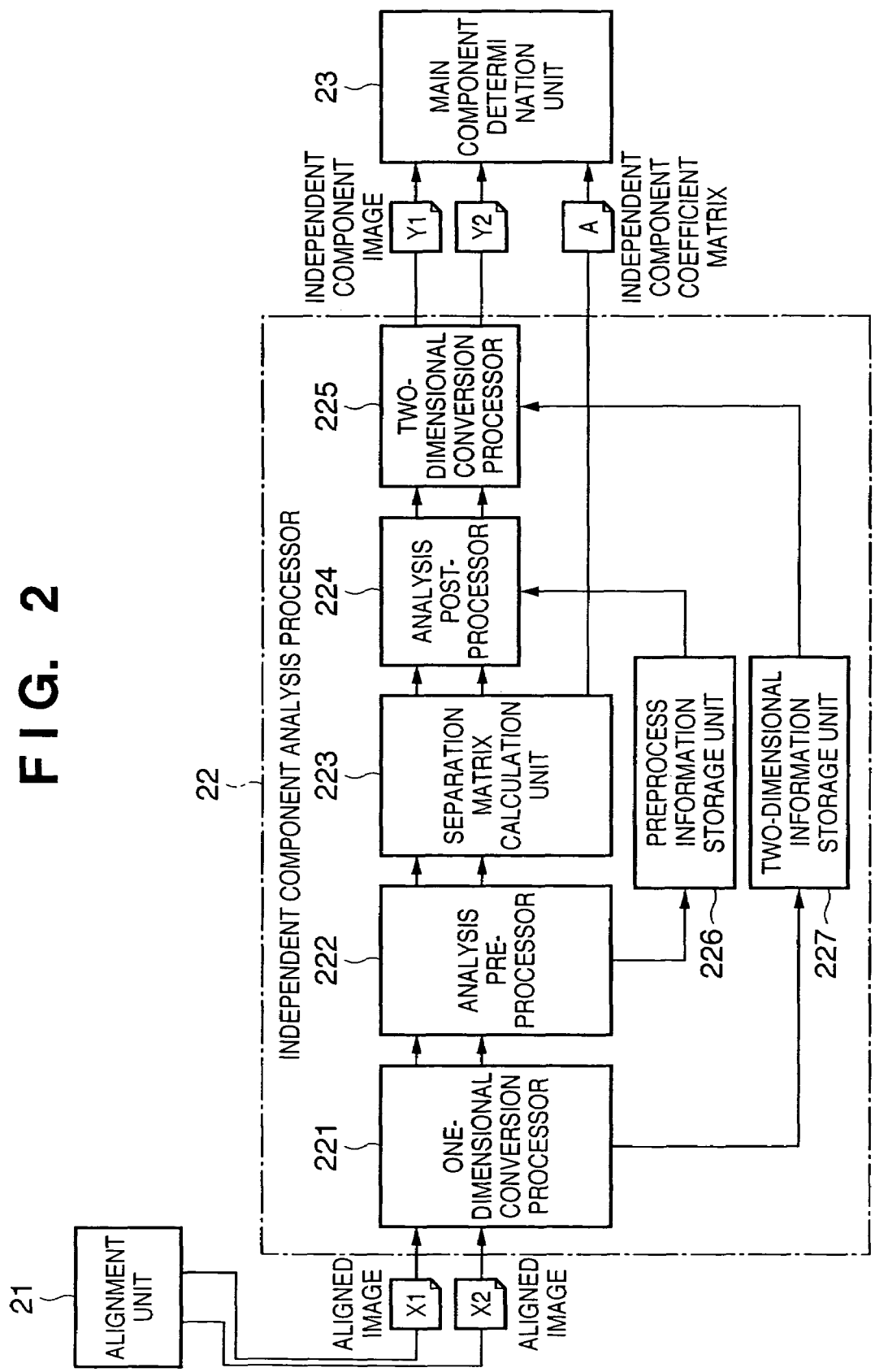
FIG. 2 is a block diagram of the arrangement of an independent component analysis processor.

FIG. 2 is a diagram of the arrangement of the independent component analysis processor 22 of the change-over-time detection unit 20. The independent component analysis processor 22 comprises a one-dimensional conversion processor 221, analysis preprocessor 222, separation matrix calculation unit 223, analysis postprocessor 224, two-dimensional conversion processor 225, preprocess information storage unit 226, and two-dimensional information storage unit 227.

Each of the alignment unit 21, independent component analysis processor 22, and main component determination unit 23 can be implemented as software and can be implemented as a module constituting a software program which operates on a computer. Alternatively, as another implementation method, some or all of the alignment unit 21, independent component analysis processor 22, and main component determination unit 23 can be provided as hardware.

The change-over-time display unit 30 processes and outputs each input image such that a resultant image is suitable for a doctor's radiogram interpretation. The change-over-time emphasis image generator 31 generates a change-over-time emphasis image using an image generated by the change-over-time detection unit 20 and an image generated by the image generator 10. The display image selection unit 32 selects an image generated by the change-over-time emphasis image generator 31 and supplies the image to the subsequent display unit 33. The display unit 33 displays the image output from the display image selection unit 32.

Figure 3:
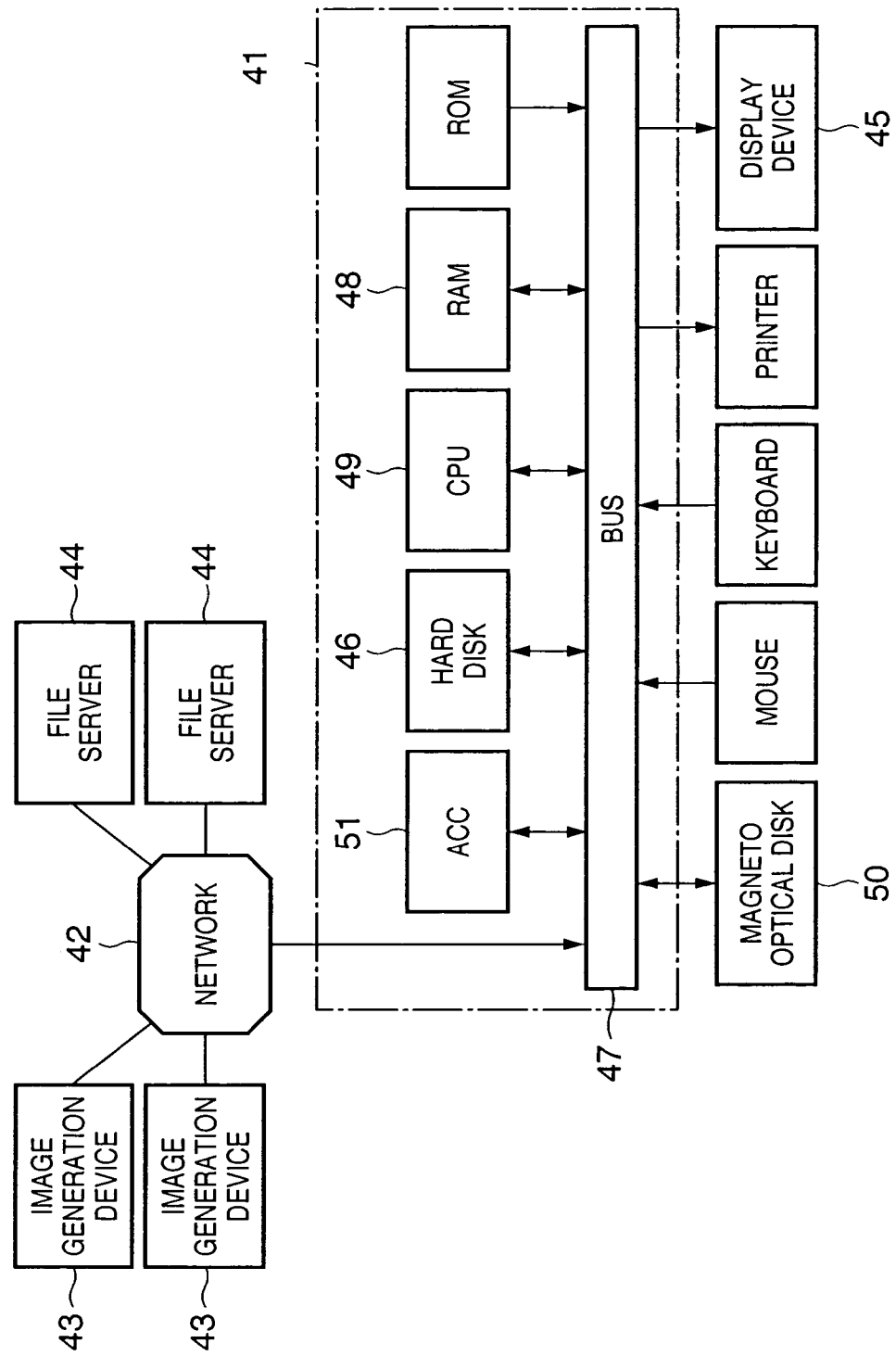
FIG. 3 is a block diagram of the arrangement of a change-over-time detection unit according to an embodiment.

To implement these functions, an arrangement as shown in, e.g., FIG. 3 can be used. Referring to FIG. 3, a computer 41 is connected to one or a plurality of image generation devices 43 through a network 42. The various radiographic apparatuses described as for the image generator 10 correspond to the image generation devices 43. The same applies to a case wherein an image radiographed by a radiographic apparatus (not shown) is previously stored in a file server 44, and the file server 44 is treated similarly to the image generator 10.

Referring to FIG. 3, the change-over-time detection unit 20 and change-over-time display unit 30 can be implemented by the computer 41 and peripheral devices connected to the computer 41. For example, the change-over-time detection unit 20 and change-over-time display unit 30 can be implemented as a display device 45 and a program stored in a hard disk 46. In this case, a user input (not shown) causes the program stored in the hard disk 46 to be loaded into a RAM 48 through a bus 47. A CPU 49 sequentially executes the program in the RAM 48 to implement the above-mentioned functions. As a result of the process, the obtained image is displayed on the display device 45. As the display device 45, e.g., a CRT monitor, liquid crystal display, or the like can be used.

The program which implements the present invention need not be stored in the hard disk 46. The program may be stored in a magnetooptical disk 50 connected to the computer 41 as an external storage device or the file server 44 connected through the network. Alternatively, the change-over-time detection unit 20 and change-over-time display unit 30 according to the present invention may partially or entirely be implemented as dedicated hardware 51 incorporated in the computer 41.

Figure 4:
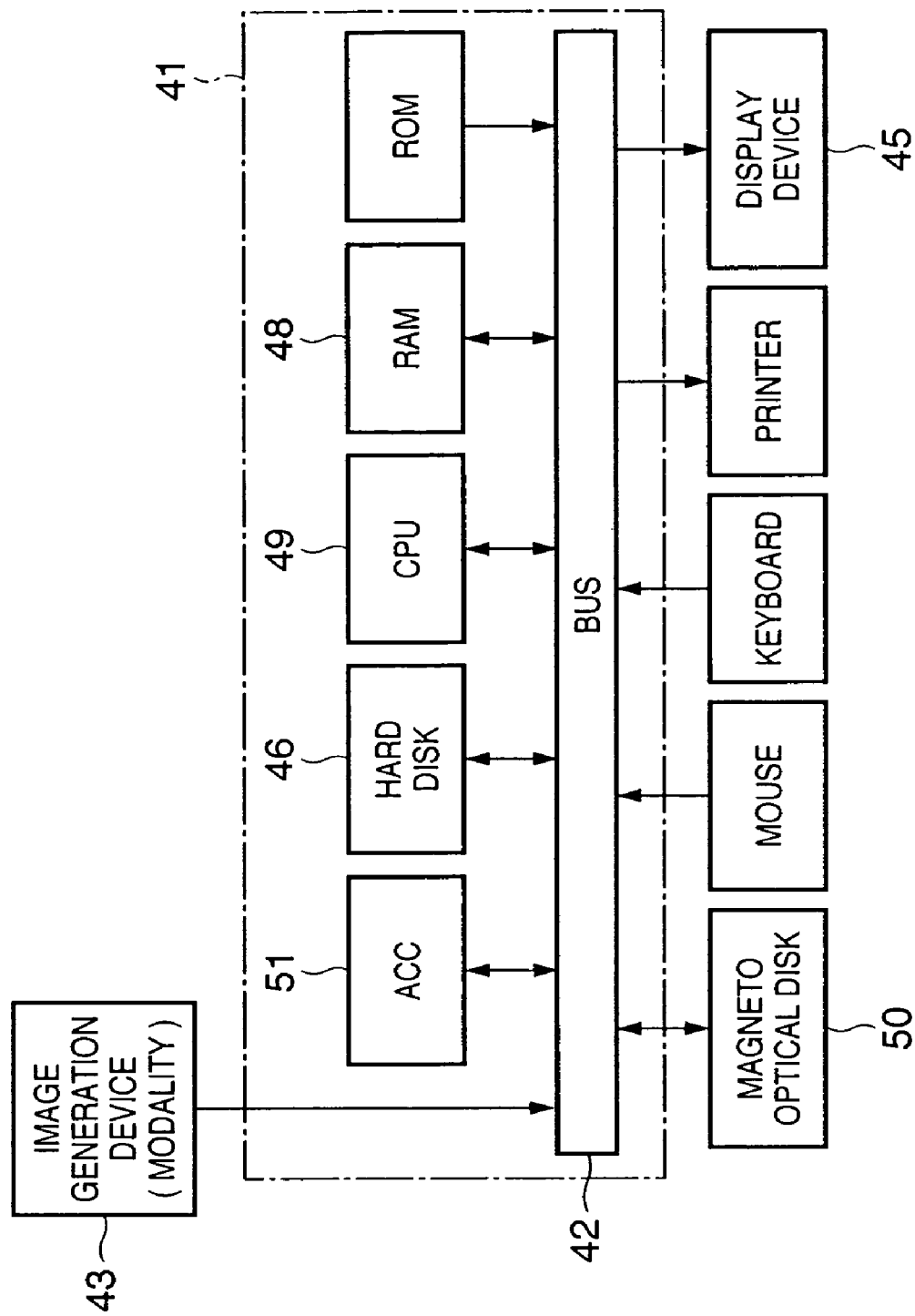
FIG. 4 is a diagram of the arrangement of a change-over-time display unit according to the embodiment.

The present invention is not limited to connection through the network 42, as shown in FIG. 3, and may have an arrangement as shown in FIG. 4. In the arrangement of FIG. 4, the computer 41 is directly connected to the image generation device 43 and directly supplies an image to the image generation device 43. If the image generation device 43 comprises the computer 41, as described above, the present invention can also be implemented in the radiographic apparatus in the above-mentioned manner.

Figure 5:
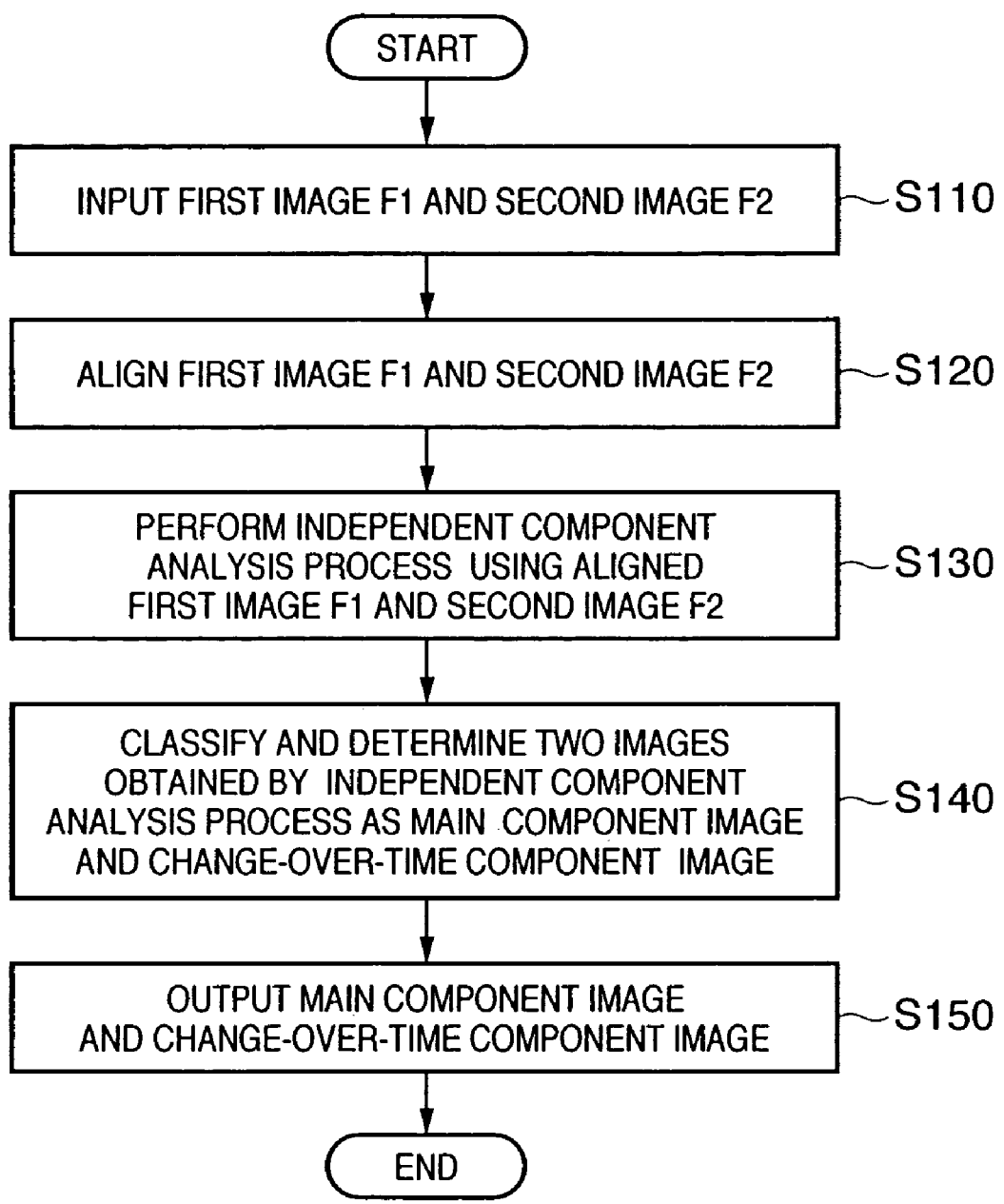
FIG. 5 is a flowchart of an overall process.
Figure 6:
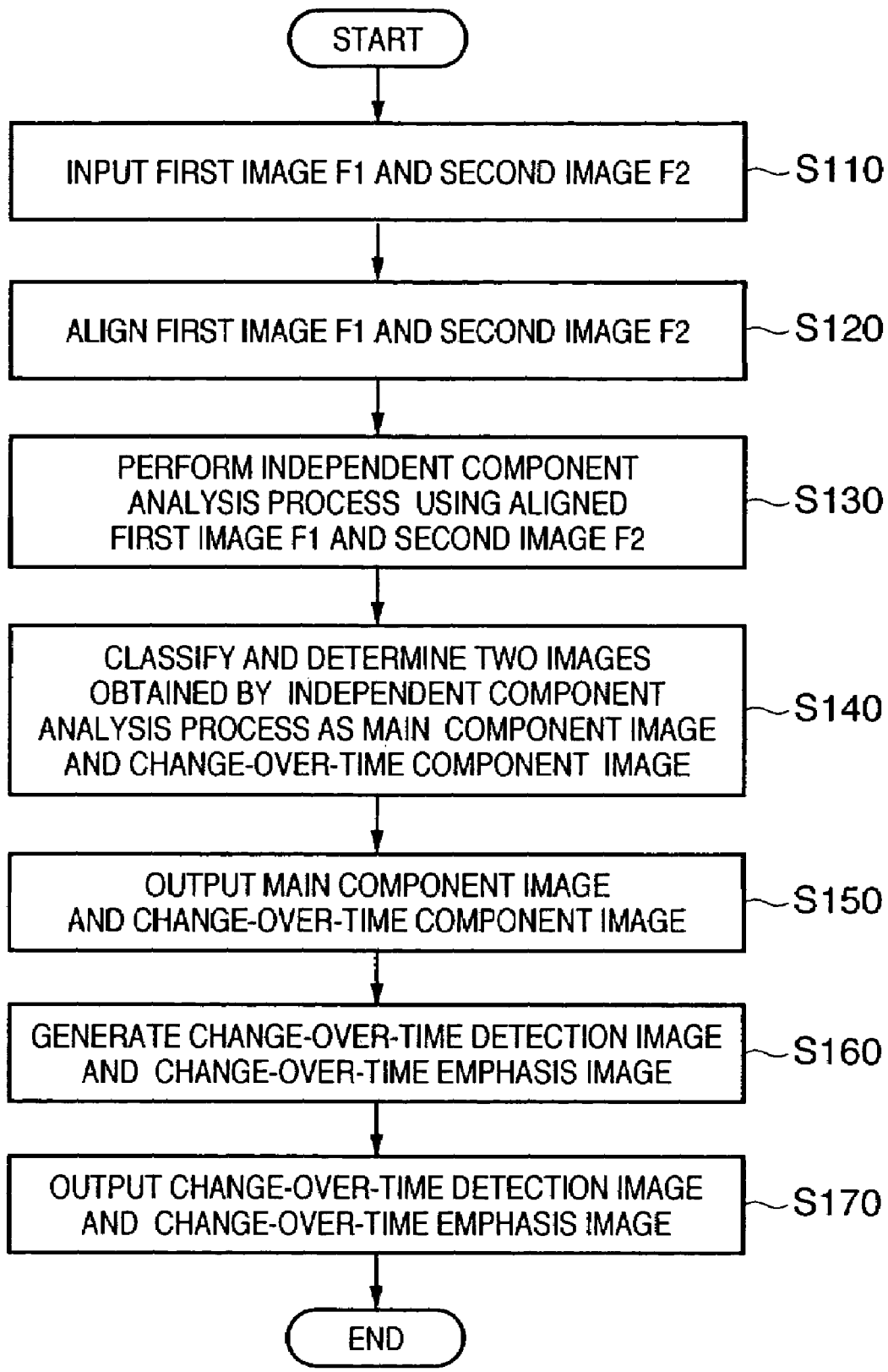
FIG. 6 is a flowchart of the overall process.
Figure 7:
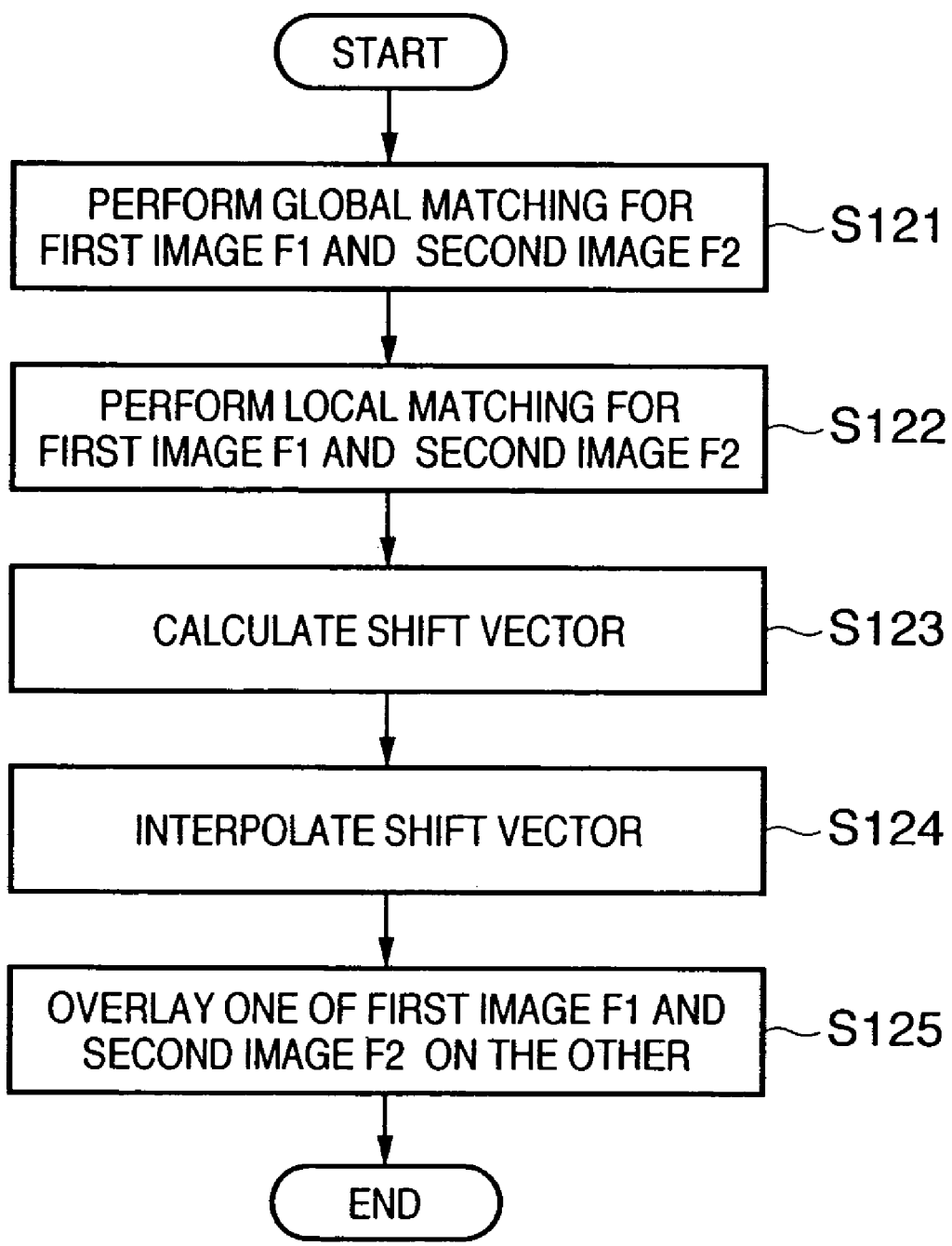
FIG. 7 is a flowchart of a subroutine that pertains to alignment.
Figure 8:
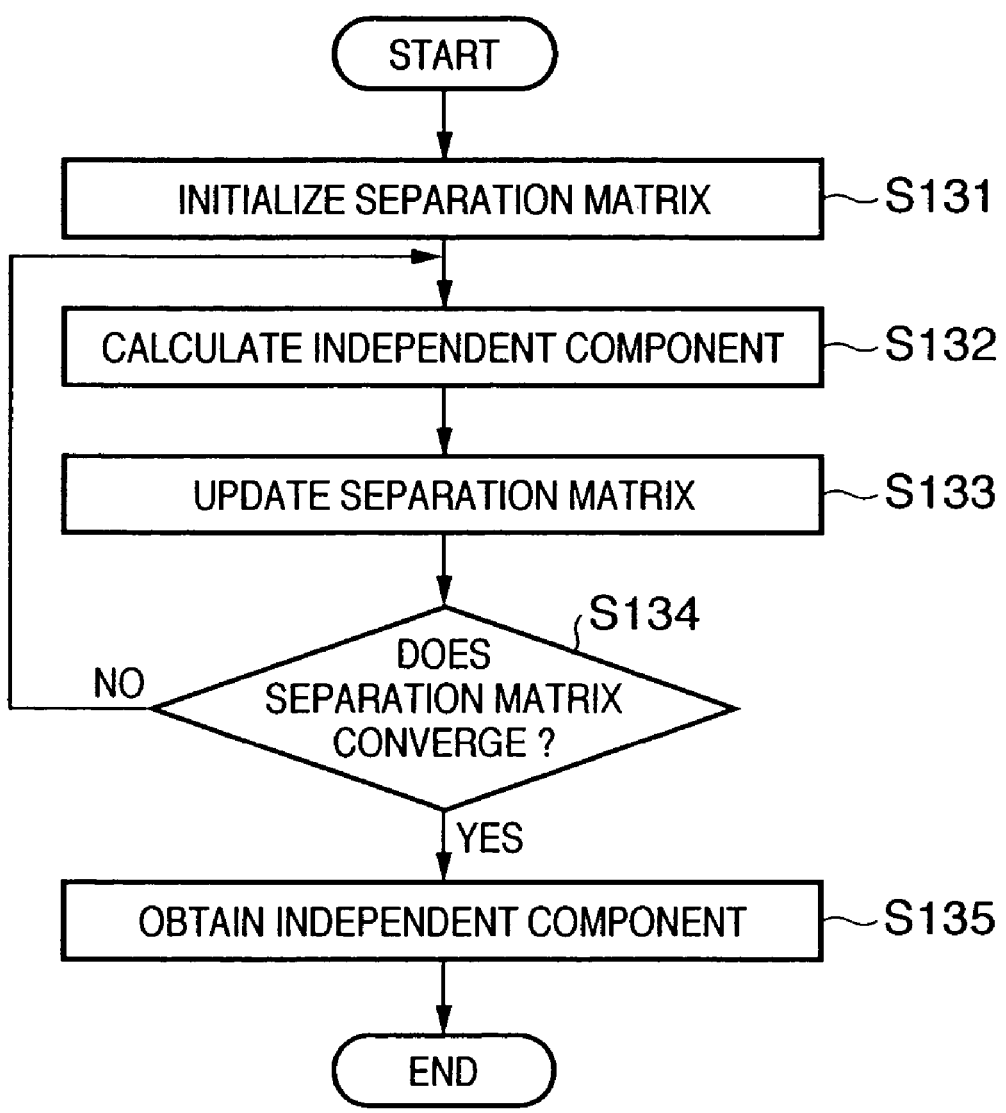
FIG. 8 is a flowchart of a subroutine that pertains to an independent component analysis process.
Figure 9:
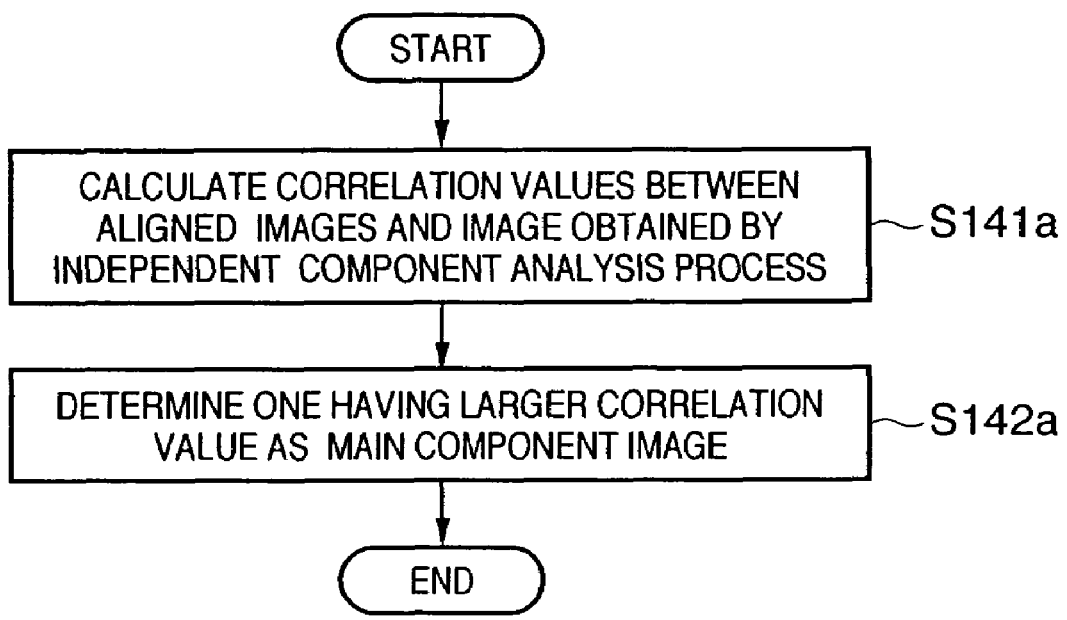
FIG. 9 is a flowchart of a subroutine that pertains to a main component determination process and uses a correlation value.
Figure 10:
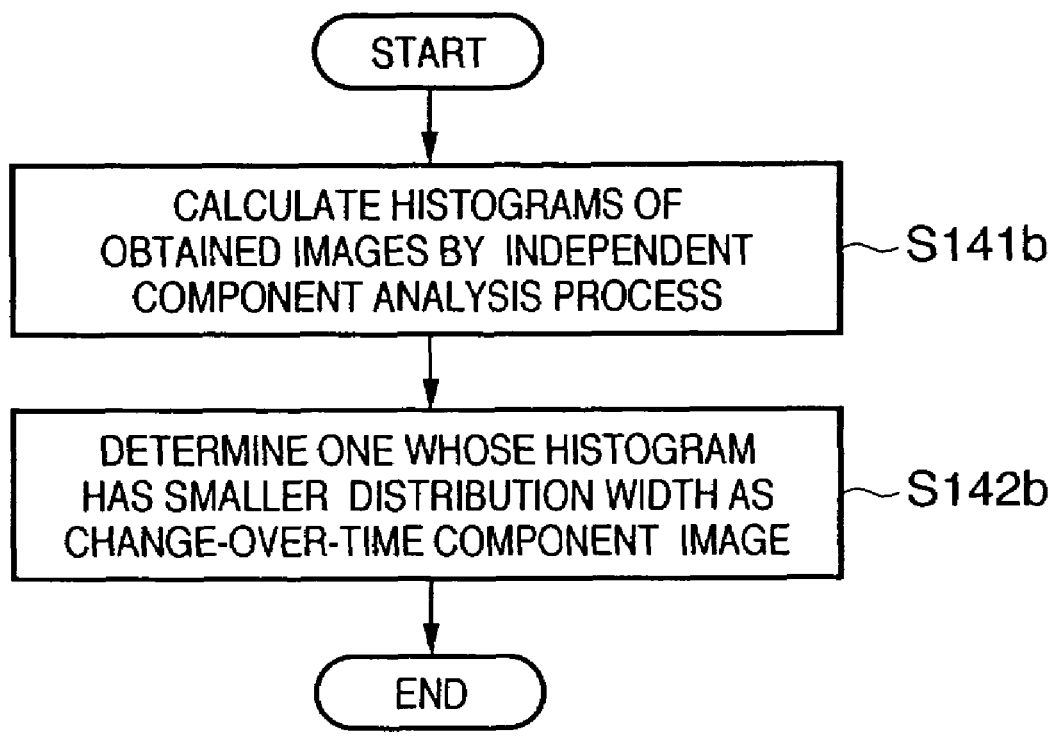
FIG. 10 is a flowchart of a subroutine that pertains to the main component determination process and uses a histogram.

FIGS. 5 and 6 are flowcharts of the overall process; FIG. 7, a flowchart of a subroutine that pertains to alignment in the overall process flowchart; FIG. 8, a flowchart of a subroutine that pertains to an independent component analysis process in the overall process flowchart; FIG. 9, a flowchart of a subroutine that pertains to a main component determination process and uses a correlation value in the overall process flowchart; and FIG. 10, a flowchart of a subroutine that pertains to the main component determination process and uses a histogram in the overall process flowchart.

The operation of the function of each unit will be described with reference to the flowcharts in FIGS. 5 to 10. The first image F1 and second image F2 are input first (step S110). In this embodiment, these images are generated by the imaging unit 11 in the image generator 10. The images generated by the imaging unit 11 are accumulated in the storage unit 12 for accumulation and stored in chronological order for each patient and for each part. Out of images of a specific part of a specific patient accumulated in the storage unit 12, the selection unit 13 selects the two images F1 and F2. In this manner, the first image F1 and second image F2 are generated in step S110.

Then, the first image F1 and second image F2 are aligned with each other (step S120). In this alignment, any positional shift between the two images F1 and F2 input to the alignment unit 21 is detected, corresponding pixel positions of the two images F1 and F2 are detected using anatomical features, and warping is performed such that one image coincides with the other image. In the alignment operation, the first image F1 and second image F2 are subjected to global matching (step S121). After that, the first image F1 and second image F2 are subjected to local matching (step S122). The matching in two steps increases the matching precision.

Figure 11:
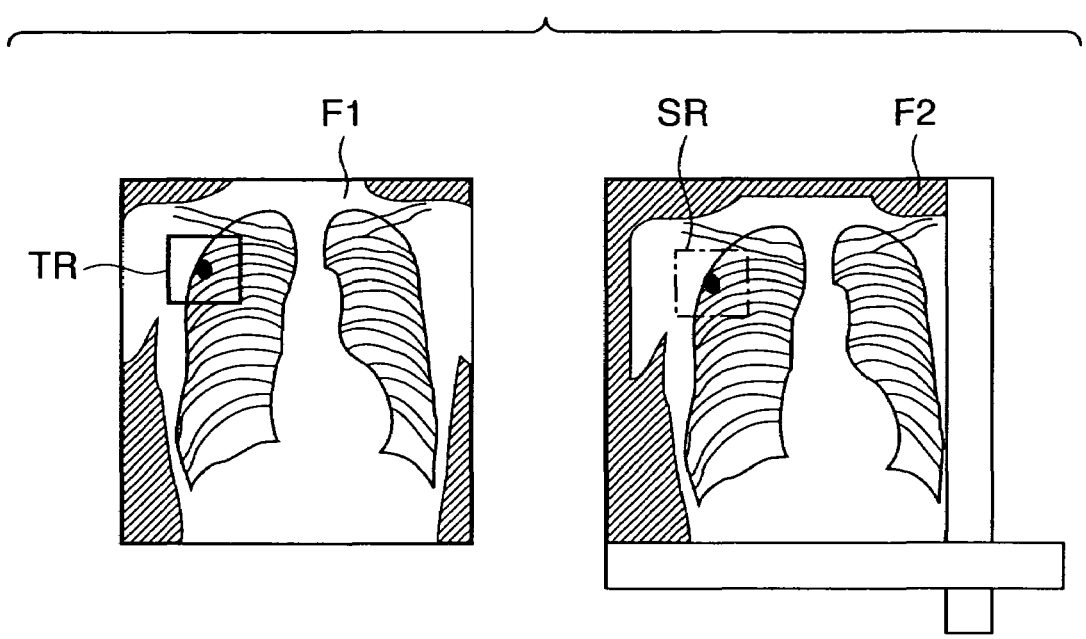
FIG. 11 is a view for explaining a pair of ROI settings.

In matching, a region of interest (ROI) serving as an alignment mark is set. FIG. 11 shows a set pair of ROIs. A template ROI TR is set for the first image F1 while a search ROI SR is set for the second image F2. The template ROI TR may be set for the second image F2 while the search ROI SR may be set for the first image F1, instead. Japanese Patent Laid-Open No. 7-37074 describes in detail alignment and a ROI setting method for the alignment.

In matching, a plurality of pairs of ROIs are set for an input image using the template ROIs TR and search ROIs SR in pairs, and template matching is performed. In the template matching, a position is changed while performing matching between image data in the template ROI TR and that in the search ROI SR, as shown in FIG. 11. A position with the highest coincidence is obtained, and a difference between the position and the set position of the template ROI TR is output as a local positional shift amount between the two images F1 and F2.

Figure 12:
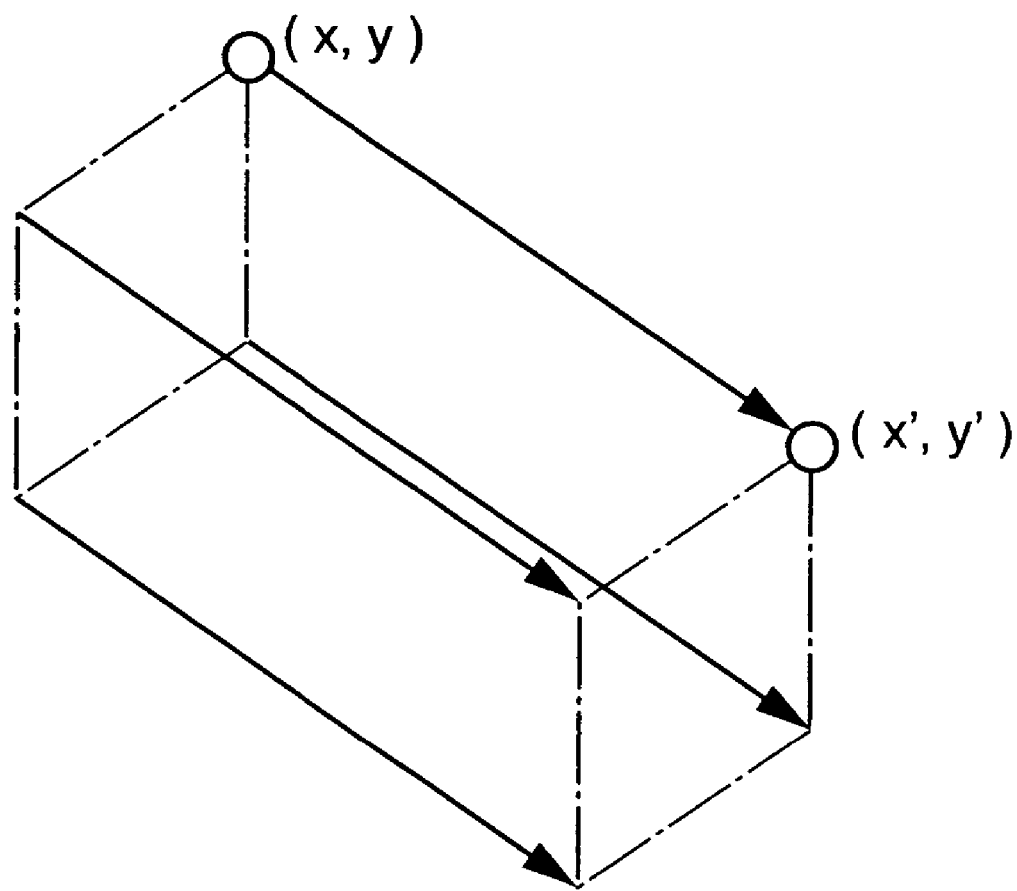
FIG. 12 is an explanatory view that pertains to a shift vector.

Since in the case of FIG. 11, the second image F2 is obtained by translating the first image F1 in the lower right direction, a shift vector is as shown in FIG. 12. A shift vector is named so because it means that the coordinates (x,y) of a certain point on an image are shifted to new coordinates (x',y').

In step S124, a predetermined interpolation model is applied to a plurality of shift vectors, thereby outputting interpolation model parameters. An interpolation model parameter is a constant for uniquely determining the interpolation model. For example, if a quadratic that pertains to x in $y=ax^2+bx+c$ is adopted as an interpolation model, three constants (a,b,c) serve as interpolation model parameters. As an interpolation model, a quadratic polynomial may be employed or any other interpolation model such as spline interpolation. The degree of each interpolation model may be determined in advance as an appropriate value on the basis of image evaluation of a change-over-time detection image or the like. Alternatively, the degree can adaptively be determined such that an interpolation error is smaller than a predetermined value.

A process of adjusting one of the images F1 and F2 to the other is performed using a calculated interpolation model parameter (step S125). This process involves image deformation and thus is called warping. Either of image deformation by linear transformation and image deformation by nonlinear transformation may be performed as warping. In this embodiment, affine transformation is performed. With this warping, the aligned images X1 and X2 are output. In this manner, the alignment process (step S120) ends. ROI setting and alignment calculation in the shift vector interpolation process may be repeated a plurality of numbers of times to increase the precision.

The independent component analysis process is performed using the aligned images X1 and X2 (step S130). The independent component analysis processor 22 processes the aligned images X1 and X2 output from the alignment unit 21 by independent component analysis (ICA), thereby generating two images, i.e., a main component image and change-over-time image. A main component is a structure common to the two images X1 and X2. A change-over-time image is a minor difference between the two images X1 and X2. In independent analysis, when the main component and change-over-time component are statistically independent signals, the main component and change-over-time component are extracted from the images X1 and X2, respectively.

If the two images F1 and F2 are medical images, a main component image corresponds to a normal anatomical structure while a change-over-time image corresponds to an abnormal anatomical structure. Assume that a single part of a single patient is radiographed at different times. In this case, when an abnormal anatomical change occurs during a radiographic interval, the change appears in a change-over-time component image.

For example, assume that the images F1 and F2 are chest images, the first image F1 is a radiographed image before a cancer appears, and the second image F2 is a radiographed image after the cancer has appeared. Assuming that the images correspond to the aligned images X1 and X2 having undergone alignment in the alignment unit 21, the main component image is an image of a chest structure common to the images X1 and X2 while the change-over-time component image is an image of the cancer. Since the chest structure and cancer are independent events, the two events can be extracted by independent component analysis.

The relationship between a main component image s(x,y) and a change-over-time component image $\Delta(x,y)$ is represented using the aligned image X1 (=x1(x,y)) and the aligned image X2 (=x2(x,y)) by the following equations:

$$x1(x,y)=a_{11} \cdot s(x,y)+a_{12} \cdot \Delta(x,y)$$

$$x2(x,y)=a_{21} \cdot s(x,y)+a_{22} \cdot \Delta(x,y) \qquad \ldots (1)$$

Independent component analysis outputs s(x,y), $\Delta(x,y)$, coefficients $a_{11}$, $a_{12}$, $a_{21}$, and $a_{22}$, and the output result is used by the main component determination unit 23 (to be described later). In a difference process using a conventional change-over-time difference CAD, a density correction unit 1 must accurately estimate the coefficients $a_{11}$ and $a_{21}$. In independent component analysis, since these values are automatically calculated, a density correction process is unnecessary.

An independent component coefficient matrix A is defined, for the later description, as represented by the following equation (2):

$$A = \begin{pmatrix} a_{11} & a_{12} \\ a_{21} & a_{22} \end{pmatrix} \qquad (2)$$

If the target image is a chest image, the first aligned image X1 is an image before a cancer appears, and the second aligned image X2 is an image after the cancer has appeared, it can be considered that $a_{12}=0$ in equations (1), and the first and second images are represented by:

$$x1(x,y)=a_{11} \cdot s(x,y)$$

$$x2(x,y)=a_{21} \cdot s(x,y)+a_{22} \cdot \Delta(x,y) \qquad \ldots (3)$$

Figure 13:
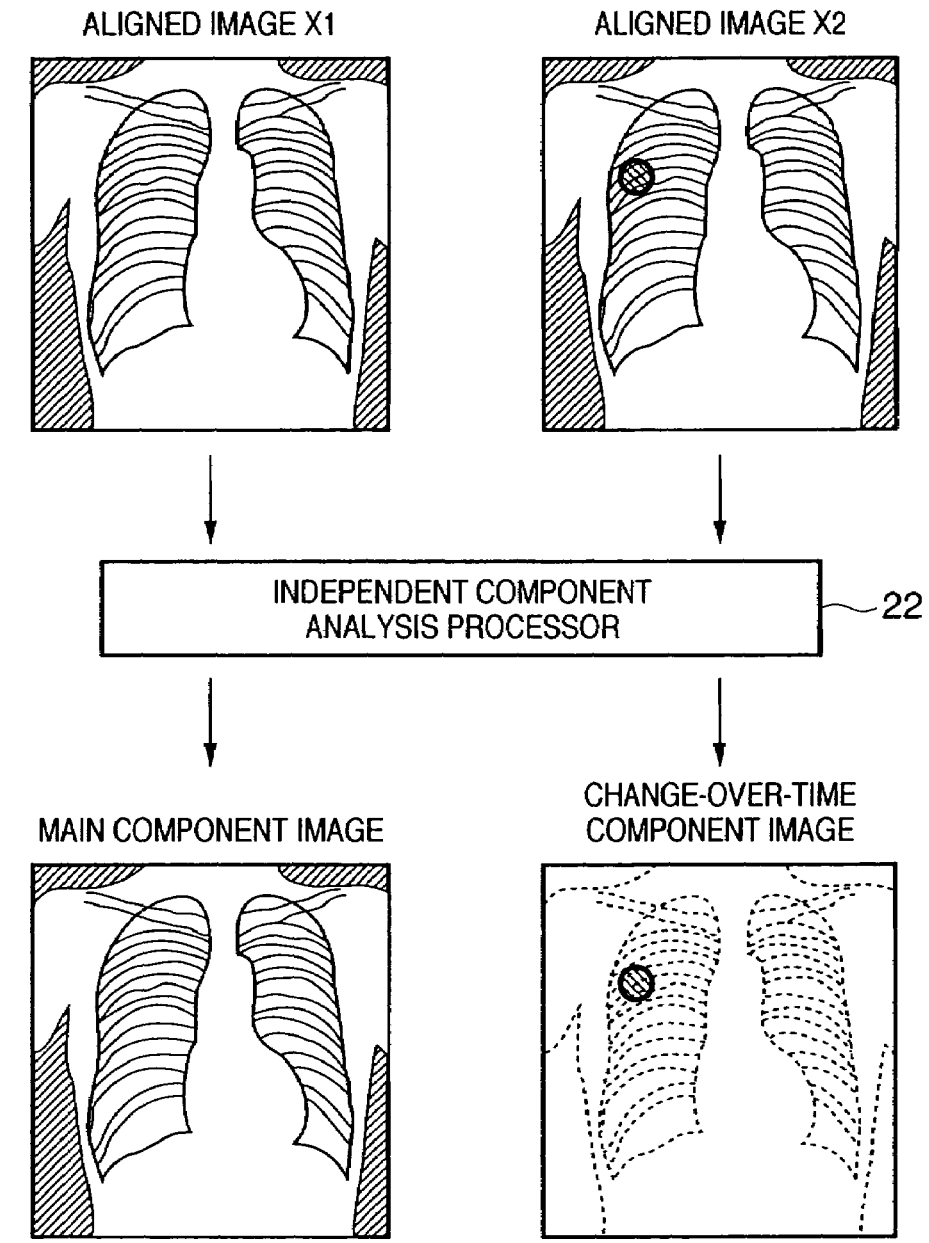
FIG. 13 is a view for explaining the independent component analysis process.

The independent component analysis process outputs the main component image s(x,y) corresponding to the chest structure and the change-over-time component image $\Delta(x,y)$ corresponding to the cancer. The target image need not be a chest image and may be an image of another part. The change-over-time component image is an image indicating a change over time and is not limited to an image of the cancer. An abnormal region of an object to be examined is output as the change-over-time component image. FIG. 13 is a view for explaining the relationship between an input image in the independent component analysis processor 22 and an output image.

The independent component analysis processor 22 outputs the two images, i.e., the main component image s(x,y) and change-over-time component image $\Delta(x,y)$. However, which of them is the main component image (change-over-time component image) is unknown. For this reason, the subsequent main component determination unit 23 determines which is the main component image s(x,y).

The independent component analysis process is a data separation method of extracting an original signal from an observation signal in which signals independent of each other are mixed without a priori knowledge other than the independence of the signal. The independent component analysis process is a new technique which has received attention in the field of speech or image processing. With this technique, even if both an original signal and a coupling coefficient are unknown, the coupling coefficient can be estimated by repeated learning, and the original signal can be separated and extracted from an observation signal.

More specifically, let $S(t)=[s_1(t), s_2(t), \ldots, s_N(t)]^T$ (t=0, 1, 2, . . . ) be N independent original signals, and $X(t)=[x_1(t), x_2(t), \ldots, x_N(t)]^T$ (t=0, 1, 2, . . . ), N observation signals. When the observation signals can be represented by $X(t)=A \cdot S(t)$, the original signals S(t) can be estimated without using any information other than the independence of the original signals and observation signals X(t). A represents a N×N real number matrix, and $[\ ]^T$ represents the transpose of the matrix.

If an inverse matrix W of the matrix A is found, the original signals can be restored by an operation $S(t)=WX(t)$. Independent component analysis assumes that the original signals S(t) are statistically independent of each other to calculate the matrix W. More specifically, operation $Y(t)=WX(t)$ is performed to calculate W such that the resultant signals $Y(t)=[y_1(t), y_2(t), \ldots, y_N(t)]^T$ (t=1, 2, . . . ) are statistically independent of each other. Since the matrix W is obtained by separating the original signals from the observations signals X(t), in which the original signals S(t) are mixed, it is called a separation matrix.

The separation matrix W is calculated sequentially simultaneously with learning or collectively. A sequential learning method will be described. As a measure of whether each signal is statistically independent, there are available mutual information amount, non-Gaussian properties, and the like. In this example, mutual information amount is adopted. Mutual information amount is a measure which has a nonnegative value, and becomes 0 only when signals are statistically independent from each other. Accordingly, the matrix W is set such that the mutual information amount between the components of the signal Y(t) approaches 0 as much as possible.

The learning method is performed in the following steps.

Step (1): The separation matrix W is initialized.

Step (2): The signals $Y(t)=WX(t)$ are calculated.

Step (3): The separation matrix is updated in accordance with an update expression $W \leftarrow W+\eta \cdot \Delta W$. Letting $\eta$ be a learning coefficient, $\Delta W$ be a change in update, and I(Y) be the mutual information amount, the update expression is updated to:

$$(\Delta W)_{ij} \propto -\{(\partial I(Y))/\partial W_{ij}\} W^T W$$

This represents the steepest descent direction with respect to the mutual information amount I(Y).

Step (4): Let e be a convergence condition, and steps (2) and (3) are repeated until $(\Delta W)_{ij} < \epsilon$ holds.

The mutual information amount will be described complementarily. Letting $p(Y)=p(y_1, y_2, \ldots, y_N)$ be a joint distribution probability density function of the signals Y(t), the mutual information amount I(Y) is defined by the following equation:

$$I(Y) = \int p(Y) \log \frac{p(Y)}{\prod_{i=1}^{N} p(y_i)} dY$$

As described above, if I(Y) is 0, and $y_1, y_2, \ldots, y_N$ are independent of each other, i.e., $$p(Y) = \prod_{i=1}^{N} p(Y_i)$$

holds, I(Y) becomes 0. Accordingly, by minimizing the mutual information amount I(Y), Y components can be made independent of each other. In step (3), the minimum value of the mutual information amount I(Y) is calculated by the steepest decent method.

Next, a case will be considered wherein the mutual information amount I(Y) is represented using the separation matrix W. An entropy of Y (entropy H(Y)) is required when the separation matrix W is updated in a direction which reduces the mutual information amount I(Y), as described in step (3). The entropy H(Y) is represented by:

$$H(Y) = -\int p(Y) \log p(Y) dY$$

Since Y=WX, the following equations:

$$p(Y)=p(X)/det(W)$$

$$dY=det(W)dX$$

hold. The entropy of Y, H(Y), is represented by the following equation:

$$H(Y)=H(X)+\log|det(W)|$$

The mutual information amount I(Y) is represented using the entropy H(Y) as:

$$I(Y) = -H(Y) + \sum_{j=1}^{N} H(y_j)$$

Therefore, the following equation holds:

$$I(W) = \sum_{j=1}^{N} H(y_j) - H(X) - \log|det(W)|$$

The mutual information amount I(Y) can be represented by a function using the separation matrix W.

Then, the change $\Delta W$ in update in step (3) will be calculated specifically.

$$(\Delta WI)_{ik} \cong -\frac{\partial I(W)}{\partial W_{ik}} W^T W$$

$$= -\frac{\partial \left( \sum_{j=1}^{N} H(y_j) - H(X) - \log|det(W)| \right)}{\partial W_{ik}} W^T W$$

$$= -\frac{\partial \left( \sum_{j=1}^{N} H(y_j) \right) - (\partial (\log | det(W)|))}{\partial W_{ik}} W^T W$$

With reference to "S. Haykin, Neural Networks, Prentice Hall, 1999", the first term of the right-hand side of the last expression can be approximated by the following equation:

$$\frac{\partial \sum_{j=1}^{N} H(y_j)}{\partial W_{ik}} \cong \varphi(y_j)x_k$$

where $\phi(y_i)$ is called an activation function and is a nonlinear function. For example, the function is represented as follows:

$$\phi(y_i)=y_i^2$$

Alternatively, the function may be represented by the following equation:

$$\phi(y_1) = (1/2)y_i^5 + (2/7)y_i^7 + (15/2)y_i^9 + (2/15)y_i^{11}$$

Letting $W_{jk}$ be an element in the jth row and the kth column of W, det(W) can be cofactorized using the cofactor $\hat{W}_{jk}$ in the following manner:

$$\det(W) = \sum_{k=1}^{N} W_{jk} \hat{W}_{jk}$$

$$j = 1, 2, \ldots, N$$

Accordingly, the differential of the logarithm of the second term of the right-hand side with respect to $W_{jk}$ is represented by:

$$\frac{\partial}{\partial W_{ik}} \log|\det(W)| = \frac{1}{\det(W)} \frac{\partial}{\partial W_{ik}} \det(W)$$

$$= \frac{\hat{W}_{ik}}{\det(W)} = (W_{ik}^T)^{-1} = W_{ik}^{-T}$$

With the above-mentioned expressions, ΔW is expressed as follows:

$$\Delta W_{jk} = \{(W^{-T})_{jk} - (y_i)x_k\} W^T W$$

This is represented in the following matrix:

$$\Delta W = \{(W^{-T}) - \phi(Y)X^T\} W^T W$$

When a relationship $Y^T = X^T W^T$ is used, ΔW is expressed as follows:

$$\Delta W = \{(W^{-T}) - \phi(Y)X^T\} W^T W$$
$$= \{I - \phi(Y)X^T W^{-T}\} W$$
$$= \{I - \phi(Y)Y^T\} W$$

The change ΔW in update in step (3) is obtained. Note that I in the above expression is a unit matrix.

As described above, the aligned images X1 and X2 are converted by the one-dimensional conversion processor 221 from the two-dimensional data format into the one-dimensional data format. The converted aligned images X1 and X2 are represented by the equation below. Note that n represents the number of pixels in an image.

$$X(n) = [x_1(n), x_2(n)]^T \ (n=1, 2, \ldots, N)$$

Figure 14A:
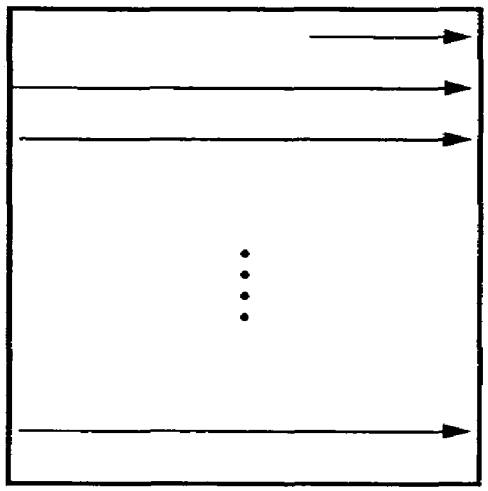
FIGS. 14A and 14B are views for explaining a part of the independent component analysis process.
Figure 14B:
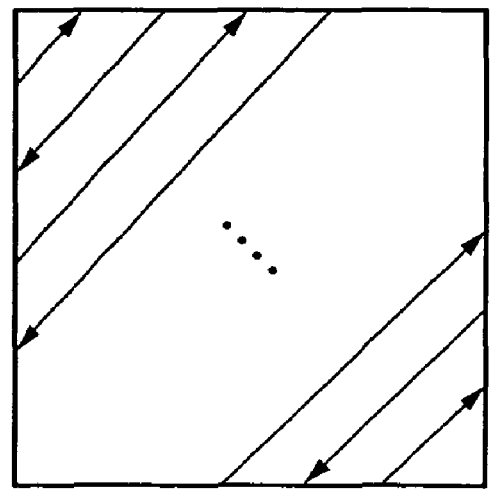

$x_1(n)$ and $x_2(n)$ may be arranged in order from the left corner of the image, as shown in FIG. 14A or may be arranged in a zigzag manner, as shown in FIG. 14B. However, $x_1(n)$ and $x_2(n)$ must be arranged in the same manner. The arrangement information used in the conversion is stored in the two-dimensional information storage unit 227. The information is referred to in the conversion from the one-dimensional data format into the two-dimensional data format after the analysis process.

After the conversion into the one-dimensional data format, X(n) is formatted such that the analysis preprocessor 222 can perform the independent component analysis process at high precision. Information used in the formatting is stored in the preprocess information storage unit 226 and is used for formatting inversion after the analysis process. In this embodiment, direct-current components are subtracted from the average of $x_1(n)$ and that of $x_2(n)$, respectively, such that the averages become equal to 0. The information of the direct-current components is stored in the preprocess information storage unit 226.

Formatted X(n) is input to the separation matrix calculation unit 223, which serves as the centerpiece of the independent component analysis process. The separation matrix calculation unit 223 calculates the separation matrix W and outputs the independent component coefficient matrix A and independent components Y(n).

The separation matrix W is calculated by the above-mentioned learning steps (1) to (4).

Step (1): The separation matrix W is initialized (step S131). In this embodiment, the initialization is performed as follows:

$$W = \begin{pmatrix} 1 & 0 \\ 1 & 1 \end{pmatrix}$$

Step (2): The independent components Y(t)=WX(t) are calculated (step S132).

Step (3): The separation matrix W is updated in accordance with an update expression (step S133). As described above, the update expression is represented by:

$$W \leftarrow W + \eta \Delta W$$

$$\Delta W = \{I - \phi(Y)Y^T\} W$$

$$\phi(y_1) = (1/2)y_i^5 + (2/7)y_i^7 + (15/2)y_i^9 + (2/15)y_1^{11}$$

$$\eta = 1$$

Step (4): Steps (2) and (3) are repeated until $(\Delta W)_{ij} < \epsilon$ holds (step S134). In this embodiment, the convergence condition $\epsilon$ is set to 0.0001. Although in this embodiment, the learning coefficient η is a constant, an update method which reduces η with an increase in the number of updates may be used.

Step (5): The independent components $Y(n) = [y_1(n), y_2(n)]^T$ (n=1, 2, . . . , N) are obtained (step S135). By calculating $A = W^{-1}$, the independent component coefficient matrix A shown below is obtained:

$$A = \begin{pmatrix} a_{11} & a_{12} \\ a_{21} & a_{22} \end{pmatrix}$$

The independent components Y(n) output from the separation matrix calculation unit 223 undergo formatting inversion in the analysis postprocessor 224 using the information stored in the preprocess information storage unit 226. In this embodiment, the formatting inversion is performed by adding the direct-current components stored in the preprocess information storage unit 226 to the independent components Y(n).

The independent components Y(n) having undergone the formatting inversion in the analysis postprocessor 224 are converted by the two-dimensional conversion processor 225 using the information stored in the two-dimensional information storage unit 227 from the one-dimensional data format into the two-dimensional data format and are output as the independent component images Y1 and Y2.

A difference from a conventional change-over-time difference CAD will be described. In the conventional change-over-time difference CAD, the first and second images are received as inputs, and one image is output as the result of the difference process. In this embodiment, the first and second images are received as inputs, and two images are output as the result of the independent component analysis process. The change-over-time component image Δ(x,y) serving as an abnormal region of an object to be examined is not the same as but similar to the result of the conventional difference process.

The main component determination unit 23 determines which is the main component image (change-over-time component image) out of the two images output from the independent component analysis processor 22 (step S140).

In this embodiment, whether the main component image or change-over-time component image is determined using a cross-correlation value. As a result of the process by the independent component analysis processor 22, the following relational expressions are obtained:

$$x1(x,y)=a_{11} \cdot y1(x,y)+a_{12} \cdot y2(x,y)$$

$$x2(x,y)=a_{21} \cdot y1(x,y)+a_{22} \cdot y2(x,y) \quad (4)$$

Which is the main component image out of y1(x,y) and y2(x,y) is determined. The change-over-time component image has a signal value much smaller than that of the main component image. For this reason, in the first expression of equations (4), the absolute value of a correlation value $R_{11}$ between the left-hand side x1(x,y) and the first term $a_{11} \cdot y1(x,y)$ is compared with a correlation value $R_{12}$ between the left-hand side x1(x,y) and the second term $a_{12} \cdot y2(x,y)$, and a larger one is determined as the main component image. More specifically, if:

$$|R_{11}|>|R_{12}|$$

holds, it is determined that y1(x,y) is the main component image while if:

$$|R_{11}|<|R_{12}|$$

holds, it is determined that y2(x,y) is the main component image (steps S141a and S142a). If the correlation absolute values $|R_{11}|$ and $|R_{12}|$ are substantially equal to each other, it is determined that the independent component analysis processor 22 has failed in normally separating images into the main component image and change-over-time component image.

To calculate each correlation value, a cross-correlation value is used in this embodiment. However, the present invention is not limited to this, and any other correlation value calculation method may be used. If it is determined that one of y1(x,y) and y2(x,y) is determined to be the main component image, the other is the change-over-time component image. In this manner, the main component determination unit 23 outputs the main component image and change-over-time component image (step S150).

The change-over-time emphasis image generator 31 generates the main component image and change-over-time component image using an image generated by the change-over-time detection unit 20 (step S160). Change-over-time detection images h1(x,y) and h2(x,y) are generated by multiplying the change-over-time component image by corresponding coefficients. Letting y2(x,y) be a change-over-time component image, the following equations are generated:

$$h1(x,y)=a_{12} \cdot y2(x,y)$$

$$h2(x,y)=a_{22} \cdot y2(x,y)$$

Additionally, change-over-time emphasis images w1(x,y), w2(x,y), k1(x,y), k2(x,y), v1(x,y), and v2(x,y) are generated in the manner shown below. Note that c is a sufficiently large constant.

$$w1(x,y)=c \cdot h1(x,y)$$

$$w2(x,y)=c \cdot h2(x,y)$$

$$k1(x,y)=y1(x,y)+c \cdot h1(x,y)$$

$$k2(x,y)=y2(x,y)+c \cdot h2(x,y)$$

$$v1(x,y)=x1(x,y)+c \cdot h1(x,y)$$

$$v2(x,y)=x2(x,y)+c \cdot h2(x,y)$$

The change-over-time emphasis images w1(x,y) and w2(x,y) are obtained by emphasizing the change-over-time detection images. Since a change over time is a minor change, it is often hard to recognize. Even in such case, the presence/absence of a change over time can be determined by glancing at each change-over-time emphasis image.

The change-over-time emphasis images k1(x,y) and k2(x,y) are obtained by emphasizing a change over time and overlying the change on the main component image. Since the change-over-time portion is overlaid and displayed on the main component image in each change-over-time emphasis image, it can be determined at which position the change-over-time portion is located on the main component portion.

Since a change-over-time portion is overlaid and displayed on a radiographed image of an object in the change-over-time emphasis images v1(x,y) and v2(x,y) as well, it can be determined at which position the change-over-time portion is located on the object.

Figure 15:
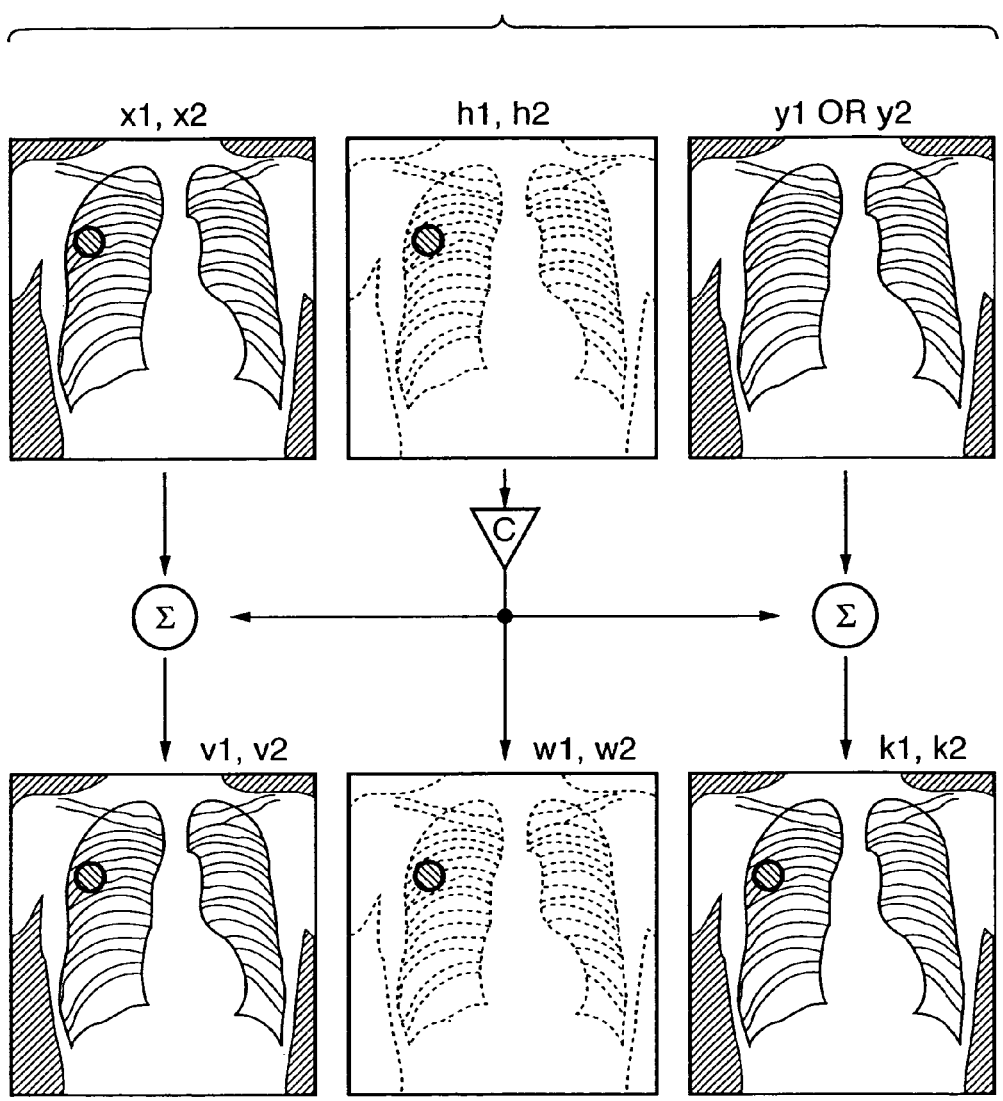
FIG. 15 is a view for explaining a change-over-time emphasis process.
Figure 16:
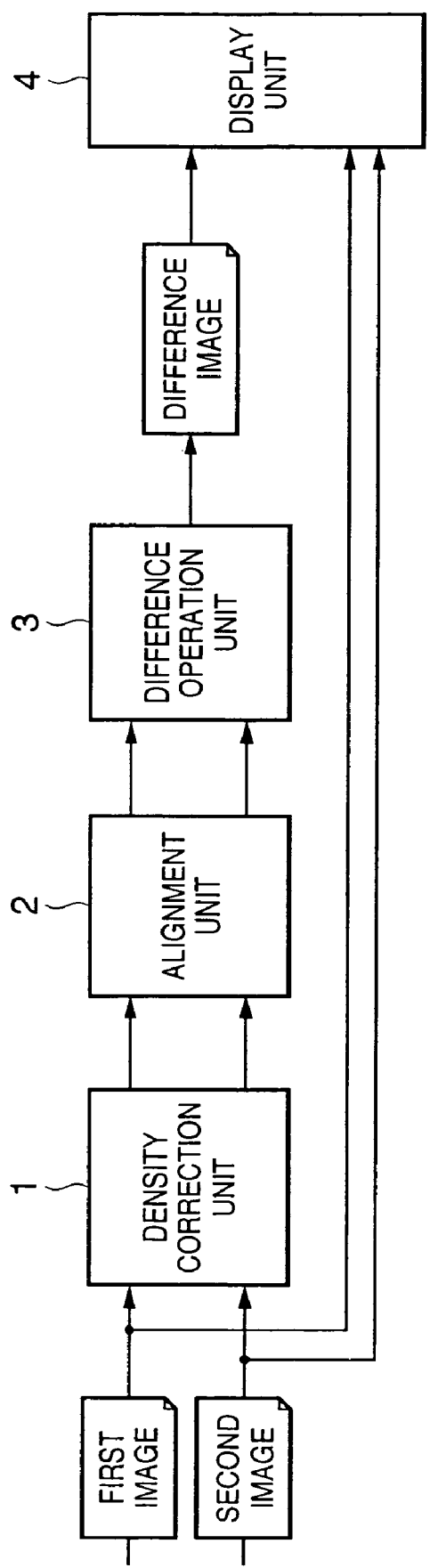
FIG. 16 is a diagram for explaining a conventional example.

The explanatory view shown in FIG. 15 indicates how a change-over-time emphasis image is related to an aligned image, change-over-time detection image, and main component image.

In the display image selection unit 32, the diagnostician selects one from images output by the change-over-time emphasis image generator 31. More specifically, one or a plurality of main component images, change-over-time component images, change-over-time detection images, change-over-time emphasis images, and aligned images are selected. The display unit 33 simultaneously displays the images selected by the display image selection unit 32.

Second Embodiment

As the second embodiment, how a main component determination unit performs determination using histograms will be described. Histograms are calculated for y1(x,y) and y2(x,y), respectively, and one having the smaller distribution width is determined to be a change-over-time component image (steps S141b and S142b). This is because the pixel values of a main component image are widely distributed from the minimum value to the maximum value while the pixels of the change-over-time component image are distributed only within a certain narrow range. If it is determined that one of y1(x,y) and y2(x,y) is determined to be the main component image, the other is the change-over-time component image. In this manner, a main component determination unit 23 outputs the main component image and change-over-time component image (step S150).

Third Embodiment

As the third embodiment, a method of generating an emphasis image using a high-pass filter or the like will be described.

In the third embodiment, change-over-time emphasis images w1(x,y), w2(x,y), k1(x,y), k2(x,y), v1(x,y), and v2(x,y) are generated in the following manner:

$$w1(x,y)=u(x,y)*h1(x,y)$$

$$w2(x,y)=u(x,y)*h2(x,y)$$

$$k1(x,y)=y1(x,y)+u(x,y)*h1(x,y)$$

$$k2(x,y)=y2(x,y)+u(x,y)*h2(x,y)$$

$$v1(x,y)=x1(x,y)+u(x,y)*h1(x,y)$$

$$v2(x,y)=x2(x,y)+u(x,y)*h2(x,y)$$

where u(x,y) is a high-pass filter function which emphasizes high-frequency components, and an operator * means a convolution operation.

In the change-over-time emphasis images w1(x,y), w2(x,y), k1(x,y), k2(x,y), v1(x,y), and v2(x,y), it can be determined at which position a change-over-time portion is located by emphasizing a change over time.

In the first and second embodiments, a change-over-time emphasis image is generated by multiplying a change-over-time detection image by constants. In this embodiment, a change-over-time emphasis image is generated using a high-pass filter which emphasizes high-frequency components. A generation method is not limited to these. A change-over-time emphasis image may be generated using various filters such as a nonlinear filter and the like.

A display image selection unit 32 selects one from images output by a change-over-time emphasis image generator 31. More specifically, one or a plurality of main component images, change-over-time component images, change-over-time detection images, change-over-time emphasis images, and aligned images are selected. In the first and second embodiments, the diagnostician selects a desired image. In this embodiment, the display image selection unit 32 selects an image in accordance with a predetermined rule. Examples of the predetermined rule include a rule "In the case of a new patient, detailed information is necessary, and thus all the above-mentioned images are selected" and a rule "In the case a patient during follow-up, the ROI is kept grasped, and thus only change-over-time detection images are selected".

Fourth Embodiment

As the fourth embodiment, another method using automatic image selection, sequential display, or the like as a display format will be described. In the fourth embodiment, as a measure of statistical independence, mutual information amount is used. However, a quartic cumulant or a statistic having a higher degree may be used instead. Alternatively, Fast ICA or JADE may be used as an independent component analysis algorithm. These algorithms are explained in Syunichi Amari and Noboru Murata, "Independent Component Analysis", an extra edition of Mathematical Science SGC Library 18, Science (2002).

In this embodiment, a sequential learning method is employed as a method of obtaining a separation matrix W. However, a collective calculation method may be used instead. The sequential learning method takes much time to obtain a solution but needs a small calculation area for operation. On the other hand, the collective calculation method takes a little time but needs a large calculation area for operation. Which method to adopt is determined depending on the image size and computing power.

The separation matrix W is calculated by the learning steps (1) to (4) described in the first embodiment. In step (5), an independent component coefficient matrix A is obtained.

A whitening process may be performed to make X(n) uncorrelated after subtracting a direct-current component by an analysis preprocessor 222. When the whitening process is performed, the separation matrix W tends to converge with a small number of steps. This is limited to a case wherein the S/N ratios of images F1 and F2 are large.

Independent components Y(n) output from a separation matrix calculation unit 223 undergo formatting inversion in an analysis postprocessor 224 using information stored in a preprocess information storage unit 226. In this embodiment, the formatting inversion is performed by adding the direct-current components stored in the preprocess information storage unit 226 to the independent components Y(n).

The independent components Y(n) having undergone the formatting inversion in the analysis postprocessor 224 are converted by a two-dimensional conversion processor 225 using the information stored in a two-dimensional information storage unit 227 from the one-dimensional data format into the two-dimensional data format and are output as independent component images Y1 and Y2.

The processes in steps S140, S141a, and S142a are performed in the same manner as in the first embodiment. In step S150, a main component determination unit 23 outputs a main component image and change-over-time detection image.

In step S160, a change-over-time emphasis image generator 31 performs a convolution operation in the same manner as in the first embodiment to generate the following equations:

$$h1(x,y)=a_{12} \cdot y2(x,y)$$

$$h2(x,y)=a_{22} \cdot y2(x,y)$$

In addition, change-over-time emphasis images w1(x,y), w2(x,y), k1(x,y), k2(x,y), v1(x,y), and v2(x,y) are generated similarly to the third embodiment in the following manner:

$$w1(x,y)=u(x,y)*h1(x,y)$$

$$w2(x,y)=u(x,y)*h2(x,y)$$

$$k1(x,y)=y1(x,y)+u(x,y)*h1(x,y)$$

$$k2(x,y)=y2(x,y)+u(x,y)*h2(x,y)$$

$$v1(x,y)=x1(x,y)+u(x,y)*h1(x,y)$$

$$v2(x,y)=x2(x,y)+u(x,y)*h2(x,y)$$

In the first and second embodiments, a change-over-time emphasis image is generated by multiplying a change-over-time detection image by constants. In this embodiment, a change-over-time emphasis image is generated using a high-pass filter which emphasizes high-frequency components, similarly to the third embodiment.

A display unit 33 displays an image selected by a display image selection unit 32. In the first to third embodiments, images selected by the display image selection unit 32 are simultaneously displayed. In this embodiment, images are sequentially displayed one by one. A display method is not limited to this, and any other method may be used. More specifically, an eyeglass-type display device may be used to display different images to both eyes.

According to an image processing method and processing apparatus of the present invention, image density correction which is important to detect a change over time can be performed at high precision by an independent component analysis process. An image in which a change over time is detected can be generated at high precision.

An image in which a change over time is detected indicates a change in condition of a disease such as a tumor, inflammation, or the like. Accordingly, the doctor or technician can easily recognize the change over time by viewing a detection image which is generated at high precision. When diagnosis operation continues over a long time, and concentration on the diagnosis lowers, the possibility of missing a change in disease condition increases. The present invention can also decrease the possibility. The variability of diagnosis results is suppressed, and the diagnosis precision increases owing to their multiplier effect.

The object of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a ROM, floppy® disk, hard disk, optical disk, magneto-optical disk, CD-ROM, CD-R, magnetic tape, nonvolatile memory card, ROM, and the like may be used.

Embodiments of the present invention include not only a case wherein the functions of the above-mentioned embodiments are implemented by executing the readout program code by the computer but also a case wherein the functions of the first to fourth embodiments are implemented by some or all of actual processing operations executed by an OS running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

If the present invention is applied to such program or a storage medium which stores the program, the program comprises, e.g., program codes corresponding to the flowcharts shown in FIGS. 5 to 10.

As has been described above, according to the present invention, there can be provided an image processing apparatus, image processing method, image processing system, program, and storage medium which can detect a change over time between two images which are different in time series at high precision.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-435271 filed on Dec. 26, 2003, which is hereby incorporated by reference herein.

What is claimed is:

1. An image processing method comprising:
an image input step of inputting two images;
an alignment step of aligning the two images;
an independent component analysis processing step of performing an independent component analysis process using the images aligned in the alignment step; and
a main component determination step of performing a determination to classify processing results output in the independent component analysis processing step as a main component image and a change-over-time component image,
wherein in the main component determination step, a similarity between the processing results output in the independent component analysis processing step and one of the two aligned images used in the independent component analysis processing step is checked to determine the main component image.

2. An image processing method comprising:
an image input step of inputting two images;
an alignment step of aligning the two images; and
an independent component analysis processing step of performing an independent component analysis process using the images aligned in the alignment step;
wherein the independent component analysis processing step comprises:
a one-dimensional conversion processing step of converting the images aligned in the alignment step from a two-dimensional data format into a one-dimensional data format;
an analysis preprocessing step of subtracting direct-current component from one-dimensional data obtained in the one-dimensional conversion processing step;
a separation matrix calculation step of calculating a separation matrix, an independent component coefficient matrix, and an independent component from the one-dimensional data obtained in the analysis preprocessing step;
an analysis postprocessing step of adding the direct-current component to the independent component calculated in the separation matrix calculation step; and
a two-dimensional conversion processing step of converting the independent component, to which the direct-current component is added in the analysis postprocessing step, into the two-dimensional data format.

3. An image processing method comprising:
an image input step of inputting two images;
an alignment step of aligning the two images;
an independent component analysis processing step of performing an independent component analysis process using the images aligned in the alignment step; and
a main component determination step of performing a determination to classify processing results output in the independent component analysis processing step as a main component image and a change-over-time component image,
wherein in the main component determination step, histograms are generated from the processing results output in the independent component analysis processing step, and out of the two images, one whose histogram has a smaller distribution width is determined to be the change-over-time component image.

4. An image processing method comprising:
an input step of inputting two images;
an alignment step of aligning the two images;

an independent component analysis processing step of performing an independent component analysis process using the images aligned in the alignment step; and a main component determination step of performing a determination to classify processing results output in the independent component analysis processing step as a main component image and a change-over-time component image; and further comprising a change-over-time emphasis image generation step of generating an image having an emphasized change-over-time portion by overlaying an image in which the change-over-time component image determined in the main component determination step is emphasized by filtering one of the images input in the image input step, and aligned images used in the independent component analysis step, and the main component image determined in the main component determination step.

5. The method according to claim 1, wherein the two images are obtained by radiographing a single part at different time points.

6. The method according to claim 1, wherein the alignment step is a step detecting corresponding pixel positions of the two images using anatomical features and performing warping so as to match one of the images to the other image.

7. A program stored on a computer-readable medium, for causing a computer to execute an image processing method of performing an independent component analysis process using two images, the program causing the computer to execute:

an image input step of inputting two images;

an alignment step of aligning the two images;

an independent component analysis processing step of performing an independent component analysis process using the images aligned in the alignment step; and a main component determination step of performing a determination to classify processing results output in the independent component analysis processing step as a main component image and a change-over-time component image, wherein in the main component determination step, a similarity between the processing results output in the independent component analysis processing step and one of the two aligned images used in the independent component analysis processing step is checked to determine the main component image.

8. A computer-readable storage medium which has a program recorded thereon for causing a computer to execute an image processing method of performing an independent component analysis process using two images, the program causing the computer to execute:

an image input step of inputting two images;

an alignment step of aligning the two images;

an independent component analysis processing step of performing an independent component analysis process using the images aligned in the alignment step; and a main component determination step of performing a determination to classify processing results output in the independent component analysis processing step as a main component image and a change-over-time component image, wherein in the main component determination step, a similarity between the processing results output in the independent component analysis processing step and one of the two aligned images used in the independent component analysis processing step is checked to determine the main component image.

9. An image processing apparatus comprising:

an image input configured to input two images;

an alignment unit configured to align the two images;

an independent component analysis processing unit configured to perform an independent component analysis process using the images aligned by said alignment means; and a main component determination unit configured to perform a determination to classify processing results output by said independent component analysis processing unit as a main component image and a change-over-time component image, wherein said main component determination unit determines the main component image by checking a similarity between the processing results output by the independent component analysis processing unit and one of the two aligned images used by the independent component analysis processing unit.

10. An image processing system wherein an image processing apparatus defined in claim 9 is connected to at least one of an image generation device, a display device, and a file server through a network.

* * * * *